United States Patent [19]

Ebata

[11] 4,044,432
[45] Aug. 30, 1977

[54] NET JOINTING STRUCTURE

[75] Inventor: Hiroyuki Ebata, Uozu, Japan

[73] Assignee: Yoshida Kogyo Kabushiki Kaisha, Japan

[21] Appl. No.: 665,707

[22] Filed: Mar. 11, 1976

[30] Foreign Application Priority Data

Mar. 13, 1975 Japan .................................. 50-34201

[51] Int. Cl.² ...................... A44B 19/40; A44B 19/00
[52] U.S. Cl. ........................... 24/205.16 R; 24/205 R; 43/7; 43/14; 137/384 B; 87/12
[58] Field of Search ............... 24/205.16 R, 205.16 C, 24/205 R; 43/7, 14; 139/384 B; 87/12, 13; 66/195; 160/DIG. 7

[56] References Cited

U.S. PATENT DOCUMENTS

| | | | |
|---|---|---|---|
| 1,622,250 | 3/1927 | Moore | 139/384 B |
| 2,718,047 | 9/1955 | Waldes | 24/205.16 R |
| 2,921,397 | 1/1960 | Luthi | 43/7 |
| 3,132,433 | 5/1964 | Luketa | 43/7 |
| 3,525,785 | 8/1970 | Fairbanks | 87/12 |
| 3,540,084 | 11/1970 | Frohlich | 24/205.16 C |
| 3,725,983 | 4/1973 | Selvaggi | 24/205 R |

Primary Examiner—Bernard A. Gelak
Attorney, Agent, or Firm—Bucknam and Archer

[57] ABSTRACT

A net jointing structure is provided for separably jointing or coupling a pair of nets together. The structure has a pair of elongate net strips each having first and second longitudinal opposite edges and having a mesh size progressively smaller toward the second edge, the first edge being formed integrally or adapted for connection with one end of each of the nets. A sliding clasp fastener includes a pair of stringers each having on and along one longitudinal edge a row of interlocking elements and secured at the other longitudinal edge to the second edge of the elongate net strip, and a slider slidably mounted on the rows of interlocking elements for coupling and uncoupling the pair of stringers.

8 Claims, 3 Drawing Figures

NET JOINTING STRUCTURE

BACKGROUND OF THE INVENTION

1. Field of the Invention

This invention relates to a net and more particularly, to a net jointing structure having a sliding clasp fastener for separably joining or coupling a pair of nets together.

2. Prior Art

There are certain instances where it is necessary to joint two or more nets together so as to provide an elongated combination net. For example, it is customary in the round haul net fishery for a pair of fishing boats to carry identical halves of a round haul net, respectively, and then to interconnect the halves at a fishing ground. The conventional practice of coupling the net halves together has been to knot the confronting edges of the net halves with each other. This procedure is however extremely tedious and time-consuming.

SUMMARY OF THE INVENTION

It is therefore a principal object of the invention to provide a net jointing structure which will couple and uncouple a pair of nets with utmost ease.

It is another object of the invention to provide a net jointing structure having a sliding clasp fastener for jointing jointing structure for separably jointing or coupling a pair of nets together, which structure comprises a pair of elongate net strips each having first and second longitudinal opposite edges and having a mesh size progressively smaller toward the second edge. The first edge is adapted for connection with one end of each of the nets. A sliding clasp fastener is provided with a pair of stringers each having on and along one longitudinal edge a row of interlocking elements and secured at the other longitudinal edge to the second edge of the elongate net strip. A slider is slidably mounted on the rows of interlocking elements for coupling and uncoupling the pair of stringers.

Other objects and attendant advantages of the invention will become readily apparent from the following description taken in conjunction with the accompanying drawing which illustrates certain preferred embodiments by way of example only and in which like reference numerals designate like parts throughout the views.

DESCRIPTION OF THE PREFERRED EMBODIMENTS

Figure 1:
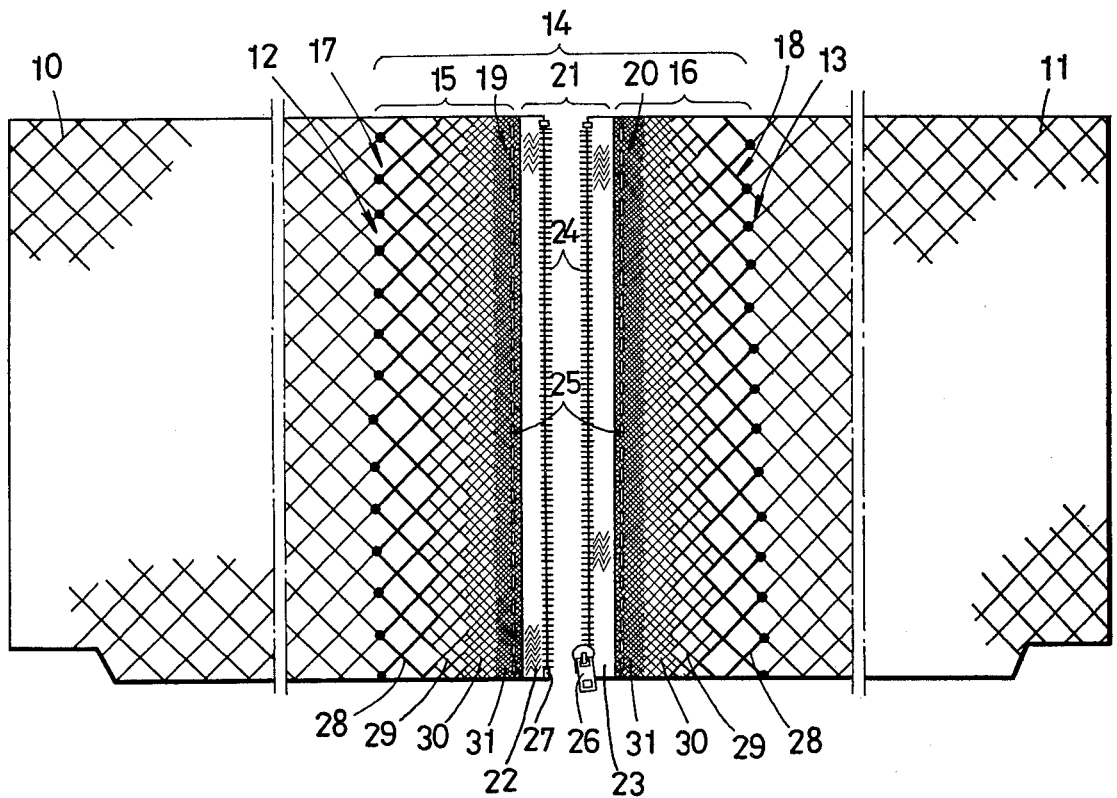
FIG. 1 is a front elevational view of a net jointing structure provided according to a first embodiment of the invention, showing the structure attached to a pair of nets to be interconnected.

Referring to FIG. 1, there is shown a pair of nets 10, 11 having confronting edges 12, 13, respectively, to be connected together. A net jointing structure 14 constructed according to the invention comprises a pair of elongate net strips 15, 16 having first or inner longitudinal edges 17, 18, respectively, and second or outer longitudinal edges 19, 20, respectively. The inner edges 17, 18 of the respective net strips 15, 16 are connected with the confronting net ends 12, 13, respectively. There is provided a sliding clasp fastener 21 including a pair of stringers 22, 23 each carrying on and along one longitudinal edge a row of discrete-type interlocking elements 24 and secured at the other longitudinal edge to the outer edges 19, 20 of the respective net strips 15, 16 by lines of stitchings 25. The sliding clasp fastener 21 further includes a slider 26 movable along the rows of interlocking elements 24 to couple and uncouple the same, and a bottom end stop 27 preferably of the usual box and pin type.

Each of the net strips 15, 16 of the net jointing structure 14 has a mesh size progressively smaller toward the outer edge 19 (20) with a view to distributing external forces applied on the net against and over the entire length of the fastener 21. More specifically, each of the net strips 15, 16 is comprised of four parallel net sections 28, 29, 30 and 31 extending longitudinally thereof, each section being smaller in mesh size than a neighboring inner one as measured progressively toward the outer edge 19 (20). The innermost net section 28 is substantially equal in mesh size to the net 10 (11) to facilitate the joining of the net strips 15, 16 with the nets 10, 11.

The connection of the net strips 15, 16 with the respective nets 10, 11 is accomplished by knotting or knitting the inner edges 17, 18 with the net ends 12, 13, respectively. Alternatively, the net strips 15, 16 may be formed integral with the nets 10, 11, respectively, by knitting marginal ends of the nets in such a manner that the mesh size thereof grows smaller and smaller toward the distal ends.

Figure 2:
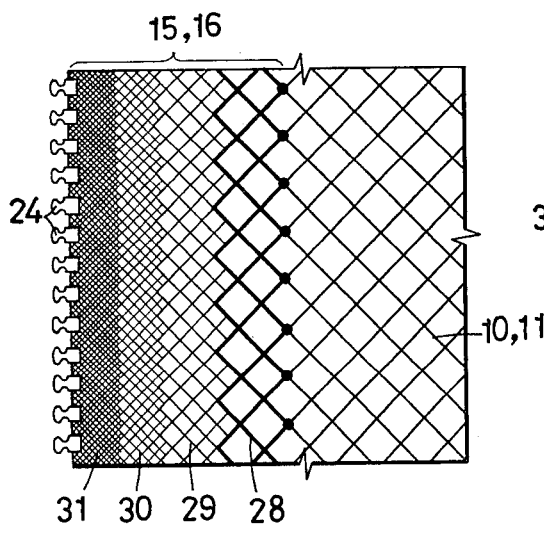
FIG. 2 is a fragmentary front elevational view of one half of a net jointing structure of a second embodiment of the invention, the structure being shown attached to a net.

According to a modification shown in FIG. 2, a row of discrete coupling elements 24 is mounted directly on the outermost net section 31 having the smallest mesh size.

Figure 3:
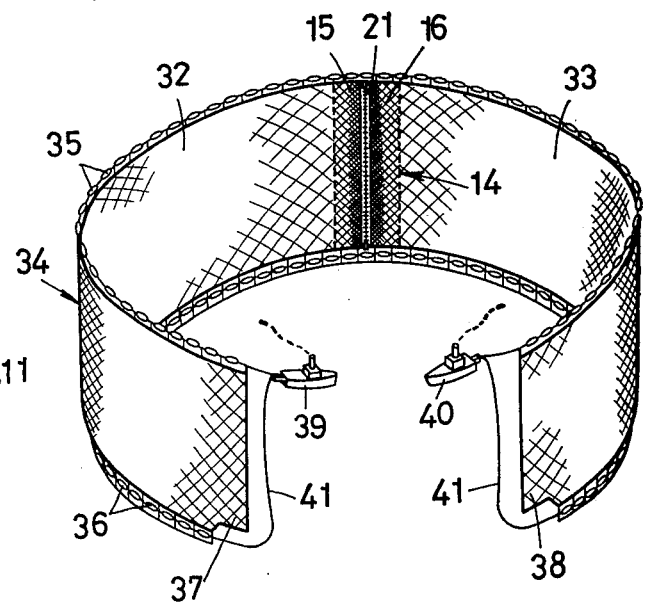
FIG. 3 is a perspective view showing identical halves of a round haul net which are interconnected by the net jointing structure of the first embodiment.

FIG. 3 shows an example in which the net jointing structure 14 of the invention is employed to interconnect identical halves 32, 33 of a round haul net 34. The coupled net halves 32, 33, that is, a complete round haul net 34, are stretched in the water by a multiplicity of floats 35 and a multiplicity of bottom weights 36 with opposite net ends 37, 38 pulled together by a pair of fishing boats 39, 40, respectively, through ropes 41. With the net jointing construction 14 of the invention, the halves 32, 33 of the round haul net 34 can be coupled easily and speedily together at a fishing ground by closing the fastener 21.

An advantage resulting from the net jointing structure 14 thus constructed is that the sliding clasp fastener 21 can be protected against deformation or damage under the influence of severe external stresses because such stresses when applied on the net are taken up and distributed uniformly over the entire length of the fastener 21 by means of the net strips 15, 16 having varying mesh sizes.

Although preferred embodiments of the invention have been shown and described in detail, various changes and modifications may be made without departing from the scope of the appended claims. For example, the net sections could be increased or reduced in number depending upon the overall size and mesh of the nets to be interconnected.

What is claimed is:

1. A net jointing structure for releaseably joining a pair of nets together, comprising; a pair of elongate net strips each having first and second longitudinal opposite edges and having a mesh size progressively decreasing toward said second edge, the first edge of each net strip being connected to a corresponding end of each of said nets; and a sliding claps fastener including a pair of stringers each having on and along one longitudinal edge a row of interlocking elements and secured at the opposite longitudinal edge to the second edge of a corresponding net strip, and a slider slidably mounted on said rows of interlocking elements for coupling and uncoupling same to correspondingly connect and disconnect said pair of stringers.

2. A net jointing structure according to claim 1, wherein each of said net strips is comprised of a plurality of parallel sections extending longitudinally thereof, each section being smaller in mesh size than a neighboring inner one as measured progressively toward said second edge.

3. A net jointing structure according to claim 1, wherein said net section at said first edge is substantially equal in mesh size to said net.

4. A net jointing structure for separably releaseably joining a pair of nets together, comprising a pair of elongate net strips each having first and second longitudinal opposite edges and having a mesh size progressively decreasing toward said second edge, the first edge of each net strip being connected to a corresponding end of each of said nets; a pair of rows of fastener elements each row secured to the second edge of a corresponding net strip; and a slider slidably mounted on said rows of fastener elements for coupling and uncoupling same to correspondingly connect and disconnect said rows of fastener elements.

5. A net jointing structure according to claim 4, wherein each of said net strips is comprised of a plurality of parallel sections extending longitudinally thereof, each section being smaller in mesh size than a neighboring inner one as measured progressively toward said second edge.

6. A net jointing structure according to claim 4, wherein said net section at said first edge is substantially equal in mesh size to said net.

7. A net jointing structure for releaseably joining a pair of nets together, comprising: a pair of elongate net strips each having first and second longitudinal opposite edges and having a mesh size progressively decreasing toward said second edge, the first edge of each net strip being formed integrally with a corresponding end of each of said nets; and a sliding clasp fastener including a pair of stringers each having on and along one longitudinal edge a row of interlocking elements and secured at the opposite longitudinal edge to the second edge of a corresponding net strip, and a slider slidably mounted on said rows of interlocking elements for coupling and uncoupling same to correspondingly connect and disconnect said pair of stringers.

8. A net jointing structure according to claim 7, wherein each of said net strips is comprised of a plurality of parallel sections extending longitudinally thereof, each section being smaller in mesh size than a neighboring inner one as measured progressively toward said second edge.

* * * * *